(12) United States Patent
Siebens

(10) Patent No.: US 9,112,322 B2
(45) Date of Patent: Aug. 18, 2015

(54) ELECTRICAL CONNECTOR WITH MULTIPLE INTERFACES

(71) Applicant: Thomas & Betts International, Inc., Wilmington, DE (US)

(72) Inventor: Larry Norman Siebens, Asbury, NJ (US)

(73) Assignee: Thomas & Betts International, LLC, Wilmington, DE (US)

( * ) Notice: Subject to any disclaimer, the term of this patent is extended or adjusted under 35 U.S.C. 154(b) by 39 days.

(21) Appl. No.: 13/793,498

(22) Filed: Mar. 11, 2013

(65) Prior Publication Data

US 2014/0057467 A1   Feb. 27, 2014

Related U.S. Application Data

(60) Provisional application No. 61/693,500, filed on Aug. 27, 2012.

(51) Int. Cl.
| | |
|---|---|
| H01R 13/187 | (2006.01) |
| H01R 25/00 | (2006.01) |
| H01R 13/17 | (2006.01) |
| H01R 13/53 | (2006.01) |
| H02B 13/00 | (2006.01) |

(52) U.S. Cl.
CPC .............. *H01R 25/006* (2013.01); *H01R 13/17* (2013.01); *H01R 13/53* (2013.01); *H02B 13/005* (2013.01)

(58) Field of Classification Search
CPC .................................................... H01R 13/187
USPC .................................. 439/281, 921, 827, 843
See application file for complete search history.

(56) References Cited

U.S. PATENT DOCUMENTS

| | | | |
|---|---|---|---|
| 2,828,473 A | 3/1958 | High | |
| 3,586,795 A | 6/1971 | Mentel | |
| 4,074,926 A * | 2/1978 | Broad | 439/89 |
| 4,445,741 A | 5/1984 | Annoot | |
| 4,571,018 A | 2/1986 | Annoot | |
| 4,714,438 A * | 12/1987 | Williams | 439/607.51 |
| 4,722,694 A | 2/1988 | Makal et al. | |
| 4,865,559 A | 9/1989 | Clabburn | |
| 5,030,122 A | 7/1991 | Birch et al. | |
| 5,226,838 A | 7/1993 | Hsu | |
| 5,421,750 A | 6/1995 | Crotty | |
| 6,296,497 B1 | 10/2001 | Xu | |
| 6,520,795 B1 | 2/2003 | Jazowski | |
| 7,278,889 B2 | 10/2007 | Muench et al. | |
| 7,387,548 B2 * | 6/2008 | Takehara et al. | 439/843 |
| 7,431,599 B2 * | 10/2008 | Luzzi | 439/181 |
| 7,491,075 B2 | 2/2009 | Hughes et al. | |
| 8,142,238 B2 * | 3/2012 | Heigl et al. | 439/843 |
| 2009/0124130 A1 | 5/2009 | Hughes et al. | |

* cited by examiner

*Primary Examiner* — Phuong Dinh
(74) *Attorney, Agent, or Firm* — Hoffmann & Baron, LLP

(57) ABSTRACT

An electrical connector having a body, first and second female interfaces, a female connector, one to four side interfaces and a connecting pin. The body has a longitudinal axis with a passage extending between the first and second female interfaces. The side interfaces extend from the body and are substantially perpendicular to the longitudinal axis. The interfaces have a distal end and a bus electrically connected to the female connector. The ends of the connecting pin are adapted to snugly engage louver-type connectors on male interfaces, which are inserted into the first and second female interfaces. The electrical connector is designed to minimize the distance between the first and second ends of the body. The side interfaces of the electrical connector can be designed to accommodate different high voltage connectors.

20 Claims, 8 Drawing Sheets

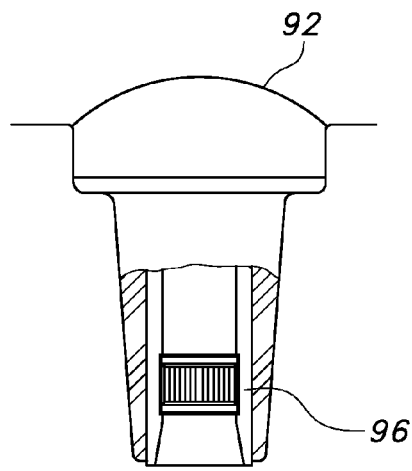
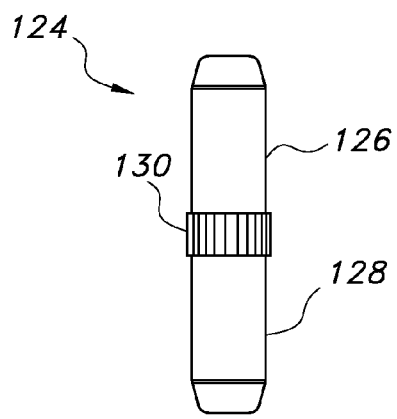
FIG. 9
FIG. 11
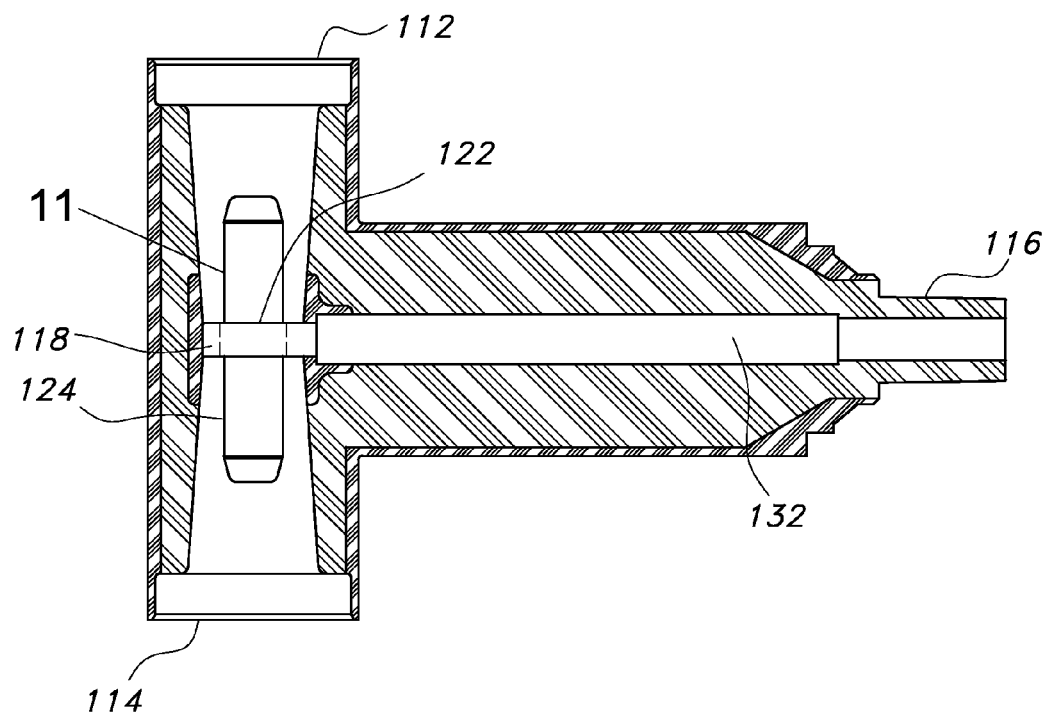
FIG. 10

US 9,112,322 B2

ELECTRICAL CONNECTOR WITH MULTIPLE INTERFACES

This application claims priority from provisional application Ser. No. 61/693,500, filed on Aug. 27, 2012, which is incorporated herein in its entirety.

FIELD OF THE INVENTION

The present invention is an electrical connector with multiple interfaces. In particular, the present invention relates to an electrical connector with multiple interfaces that can be used to connect electrical equipment in confined spaces.

BACKGROUND OF INVENTION

There is an increasing need by electrical power utility companies to install high voltage switchgear in smaller and smaller spaces. When two high voltage circuits need to be coupled, a connector is used to connect the circuit switchgear. In tight spaces, this creates an issue since bolt on connectors are typically used, which require the use of tools to rotate male bushings into the female bodies of T-connectors. In confined spaces, making these connections is difficult and time consuming.

There are many prior art methods that use currently available parts to connect electrical equipment. However, they are typically unsuitable when the space available for the installation is limited. For example, in order to bus two switches together, the switches must be connected to junctions or similar devices. This results in a relatively large assembly and requires additional space around the assembly to allow the user access to make the connection. Accordingly, there is a need for an electrical connector with multiple interfaces that can be used to connect two switches or other electrical equipment in a confined space.

SUMMARY OF THE INVENTION

In accordance with the present invention, an electrical connector with multiple interfaces is provided. The electrical connector includes: a body, first and second female interfaces, a female connector, one or more side interfaces and a connecting pin. The body has a longitudinal axis extending between first and second ends and the first and second female interfaces are located at the first and second ends with a passage extending therebetween. The one or more side interfaces extend(s) from the body and is/are substantially perpendicular to (i.e., at about 90 degrees) the longitudinal axis. At least one of the interfaces has a distal end and a bus electrically connected to the female connector. The bus extends from the distal end to the female connector, which can be a snap fit, spade or lug connector, located in the passage. The electrical connector can have a variety of different configurations including one side interface, two side interfaces extending in opposing directions from the longitudinal axis, two side interfaces extending in the same direction from the longitudinal axis and four side interfaces, wherein two of the side interfaces extend in the same direction and two of the side interfaces extend in the opposite direction from the longitudinal axis. When there are two or more side interfaces, the electrical connector can include two female connectors that are electrically connected by the connecting pin. Preferably, the body is made from a solid dielectric material.

The connecting pin is installed in the female connector (or both female connectors when the electrical connector has two female connectors) and has first and second ends corresponding to the first and second ends of the body. The female connector can be a snap-fit connector, a spade connector or a lug connector. The connecting pin electrically connects to the female connector and the bus(es) of the one or more interfaces. The first and second ends of the connecting pin are adapted to snugly engage louver-type connectors on male interfaces, preferably by press fitting the louver-type connectors onto the ends of the connecting pin, which are inserted into the first and second ends of the body. The distance between the first and second ends of the connecting pin is between 4 and 16 inches. When the electrical connector includes only one female connector, the connecting pin can be shorter. However, when the electrical connector has two female connectors, the connecting pin connects to both female connectors and, therefore, must be longer.

The electrical connector is designed to minimize the distance between the first and second ends of the body. Preferably, the distance between the first and second ends of the body for an electrical connector with one side interface is less than 16 inches, preferably less than 12 inches, and the distance for electrical connectors with two side interfaces and two female connectors is less than 24 inches, preferably less than 16 inches. For an electrical connector with one side interface, the distance between the first and second ends of the body is preferably less than the distance from the longitudinal axis to the distal end of the side interface. The side interfaces of the electrical connector can be rated at 200 amp or 600 amp and can be a loadbreak connector, a deadbreak connector, a deadbreak splice connector, a male interface, a female interface or other devices that are well known to those skilled in the art.

BRIEF DESCRIPTION OF THE FIGURES

The preferred embodiments of the electrical connector, as well as other objects, features and advantages that it provides, will be apparent from the accompanying drawings wherein:

FIG. 9 is a sectional view of an interface with a louver-type connector.

FIG. 10 is a sectional view of the electrical connector with a connector pin.

FIG. 11 shows the connector pin.

DETAILED DESCRIPTION OF THE INVENTION

Figure 1:
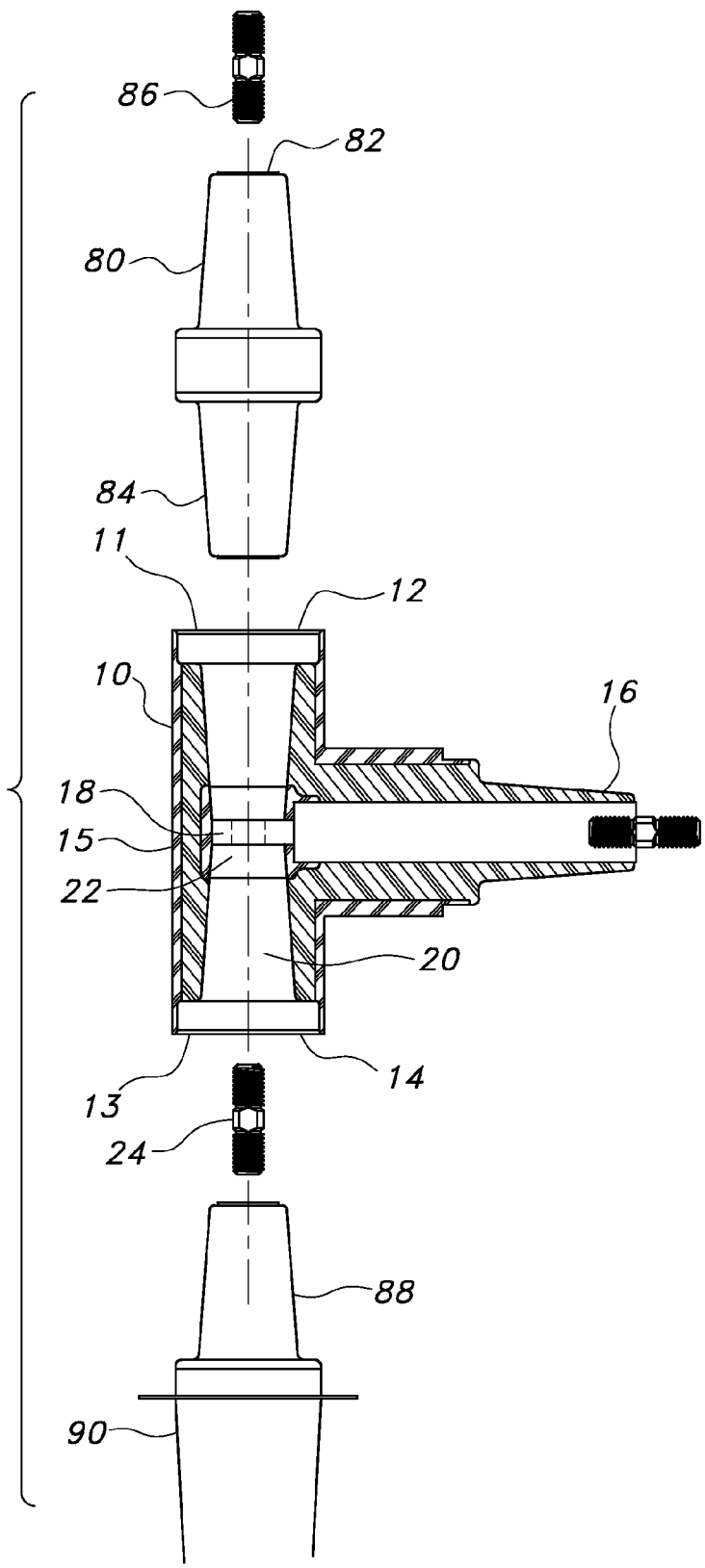
FIG. 1 is an exploded side view of a first embodiment of the electrical connector described herein with two female interfaces and a 600 amp male side interface.

The present invention is an electrical connector with one or more interfaces that can be used to connect high voltage electrical equipment in confined spaces. The electrical connector includes: a body, first and second female interfaces, a female connector, one or more side interfaces and a connecting pin. The body has a longitudinal axis extending between first and second ends and the first and second female interfaces are located at the first and second ends with a passage extending therebetween. The one or more side interfaces extend(s) substantially perpendicular to (i.e., at about 90 degrees) from the longitudinal axis and at least one interface has a distal end and a bus extending from the distal end to the female connector, preferably a snap-fit spade or lug connector, located in the passage. The connecting pin is installed in the female connector and has first and second ends corresponding to the first and second ends of the body. The intermediate portion of the connector pin has a knurled surface that is inserted into and engaged by the female connector. When installed in the female connector, the connecting pin extends at least two inches from the female connector on both ends. The first and second ends of the connecting pin are adapted to snugly engage louver-type connectors on male interfaces, preferably by press fitting the louver-type connectors onto the ends of the pin.

The electrical connector overcomes the problems of prior art connectors by eliminating the bolt on connectors that are used in the prior art. Instead, the electrical connectors described herein have a connecting pin located inside the passage between the two opposing female interfaces of the T-shaped body of the connector. The opposing ends of the connector pin connect to louver-type connectors in the male bushings on either side by a push-on connection (also referred to herein as a "press-fit" connection). The connecting pin is inserted in a female connector, preferably a spade connector, that is connected to the electrical bus of a third interface, preferably a 200 or 600 amp male interface. Preferably, the connector pin is secured in the female connector so that the connection frictionally maintained and the pin is prevented from dislodging or becoming loose. Various configurations of the connectors can be pre-molded and installed in the system depending upon what type of interface is needed to connect to components outside of the system. The connector pin reduces the amount of space needed to make a connection between various combinations of male and female connectors. After installation, the distal ends of two connectors connected by the electrical connector are typically separated by less than 6 inches.

In a preferred embodiment, the connector has two opposing female interfaces and a third interface (also referred to herein as a "side interface" and preferably a male interface) located 90° from the centerline (i.e., the longitudinal axis) of the two female interfaces. However, in other embodiments, the connector can have side interfaces oriented at different angles from the centerline of the connector. For example, the side interface can extend from the centerline of the connector at an angle of 45 degrees. The connector can also have a fourth interface (i.e., a second side interface) on the same side as the third interface or on the opposite side. In addition, the connector can have third and fourth interfaces on one side and fifth and sixth interfaces (i.e., third and fourth side interfaces) on the opposite side. The additional interface(s) can be a 600 amp deadbreak, a 200 amp deadbreak, a 200 amp loadbreak, a 600 amp splice or a 200 amp bushing well.

A preferred application for the electrical connector is to connect two switches together. The third and/or fourth interfaces (i.e., the two side interfaces) are used for bus connections to the switches. In place of the studs used in prior art connectors for connecting the parts, the electrical connectors described herein use a double ended connecting pin, which is pressed into the female connector located in the middle of the passage between the two female interfaces. These pins connect to the switches through louver-type contacts (also referred to herein as "louver-type connectors") inside the bus bars. The electrical connectors require a minimum amount of space and allow an assembled three-way switch to be small enough to fit into a 30" diameter vault (see FIG. 12). When there is more than one side interface, the electrical connector can have two female connectors located in the passage between the two female interfaces. The two female connectors can be electrically connected by one connecting pin or they can be connected together by a bus and the other sides of the female connectors can be connected individually by separate connecting pins.

The female connector (e.g., a snap-fit, a spade or a lug connector) is located inside the passage and is electrically and mechanically connected to a bus that extends to the distal end of the side interface. As used herein, a "snap-fit connector" has a body with an aperture through which the connecting pin is inserted. The wall around the aperture is biased and exerts an inward force. The connecting pin is forced through the aperture and the intermediate section of the connecting pin is secured by the inward force exerted against it. As used herein, a "spade connector" has a body with an aperture that is enclosed on three sides and open on the fourth side. As used herein, a "lug connector" has a body with an aperture for receiving the connecting pin. One female connector can be connected to two busses to accommodate two side interfaces. When there are more than two side interfaces or two side interfaces are not aligned, a second female connector is used. The female connectors have an aperture that is coaxially aligned with the passage in the connector body so that a continuous opening between the first and second ends of the body is maintained until the connecting pin is installed in the female connector. When there is only one side interface, only one female connector is required for connecting to the bus bar.

The connecting pin is inserted in the female connector and can have a length (i.e., the distance between the first and second ends) of from about 4 to 10 inches, preferably from about 4 to 8 inches. When there are two connectors extending from opposing sides of the body of the electrical connector, they can share the same female connector and the connector pin can have the same dimensions. However, when the electrical connector has two side interfaces on the same side or more than two side interfaces, at least two female connectors are required. The connector pin is inserted in the two or more female connectors to electrically and mechanically connect them. For this embodiment, the connecting pin can have a length of from about 6 and 16, preferably from about 8 to 12 inches. In other embodiments, the two female connectors are electrically connected by bus and two connecting pins are used to connect the female connectors on the sides facing the end of the connector. In this case, the connecting pins have a length of from about 2 to 6 inches, preferably from about 2 to 4 inches.

The connecting pin is made of an electrically conductive metal material, preferably copper. However, other electrically conductive metal and alloy materials can be used and are within the scope of the invention. The diameter of the connecting pin is selected depending on the rating of the electrical connector and the electrically conductive metal material that is selected. For example a connecting pin for a 600 amp electrical connector would have a larger diameter than the connecting pin for a 200 amp electrical connector. Connecting pins of any diameter can be used as long as they can safely conduct the electrical load that passes through the electrical connector and comply with the applicable codes and standards for such electrical connectors. One skilled in the art would be familiar with the electrical requirements for the connecting pin and would be able to select the proper connecting pin for a given application.

Preferably, the housing for the electrical connector is constructed from a solid dielectric material, most preferably ethylene propylene diene monomer ("EPDM") rubber. High voltage electrical equipment housings constructed using high dielectric strength EPDM rubber insulation is described in U.S. Pat. Nos. 5,667,060; 5,808,258; and 5,864,942 to Luzzi, all of which are incorporated herein in their entirety. The electrical connector is compatible with devices that conform to ANSI/IEEE standards for separable insulated connector systems for power distribution systems, e.g., ANSI/IEEE Standard 386-2006. The electrical connector can be used to connect bushing wells that have a design similar to the bushing disclosed in U.S. Pat. No. 7,556,540 to Siebens et al., which is incorporated herein in its entirety.

Referring now to the drawings, FIG. 1 shows an exploded side view of a first embodiment of the electrical connector 10 has a body 15 with two female interfaces 12, 14 and a 600 amp male interface 16. A female connector 18 in the center of the passage 20 between the first and second ends 11, 13 of the electrical connector 10 has an aperture 22 for receiving a connector pin 24. As FIG. 1 illustrates, one of the female interfaces 12 of the electrical connector 10 can be connected to a connector plug 80 having two 600 amp male interfaces 82, 84. One of the male interfaces 82 of the connector plug 80 is connected to the electrical connector 10 and the other male interface 84 can use a connector stud 86 to make an additional connection. The other female interface 14 of the electrical connector 10 can be connected to a 600 amp male interface 88 on an apparatus bushing 90.

Figure 2:
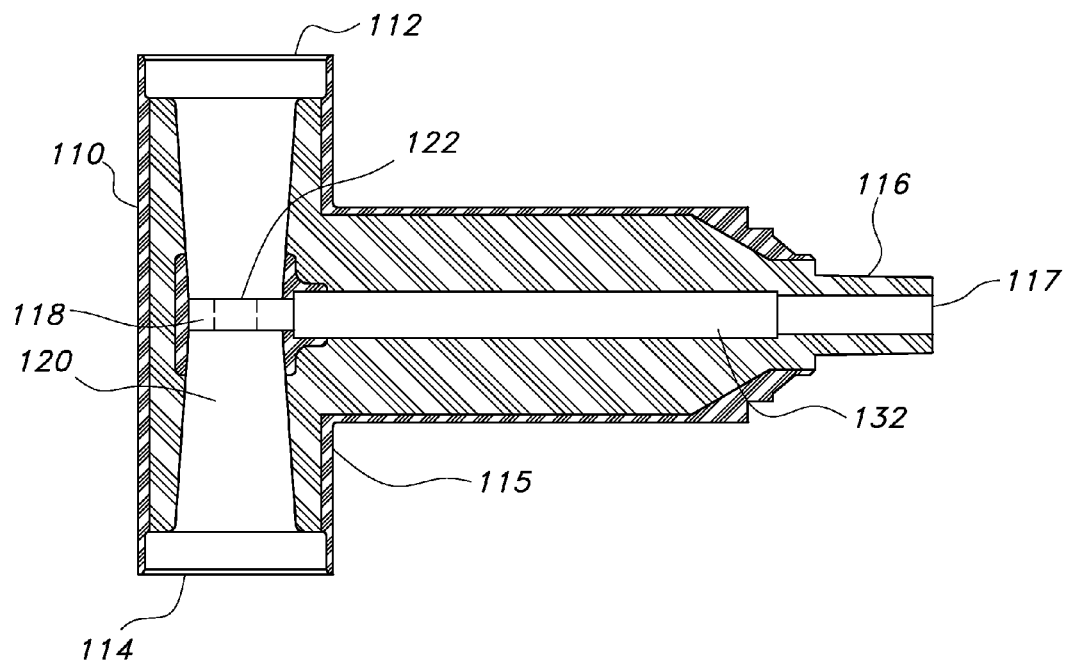
FIG. 2 is a sectional side view of a second embodiment of the electrical connector described herein with two female interfaces and a side interface for attaching 200 amp deadbreak elbow products.

FIG. 2 shows a second embodiment of the electrical connector 110 has a body 115 with two female interfaces 112, 114 on opposing ends of the passage 120 through the body and a side interface 116 for attaching 200 amp deadbreak elbow products. An electrical bus 132 extends from a female connector 118 with an aperture 122 located in the passage 120 to the distal end 117 of the side interface 116. The electrical connector 110 in FIG. 2 is the same as the electrical connector 10 in FIG. 1 except that the third (side) interface 116 is a 200 amp deadbreak connector.

Figure 3:
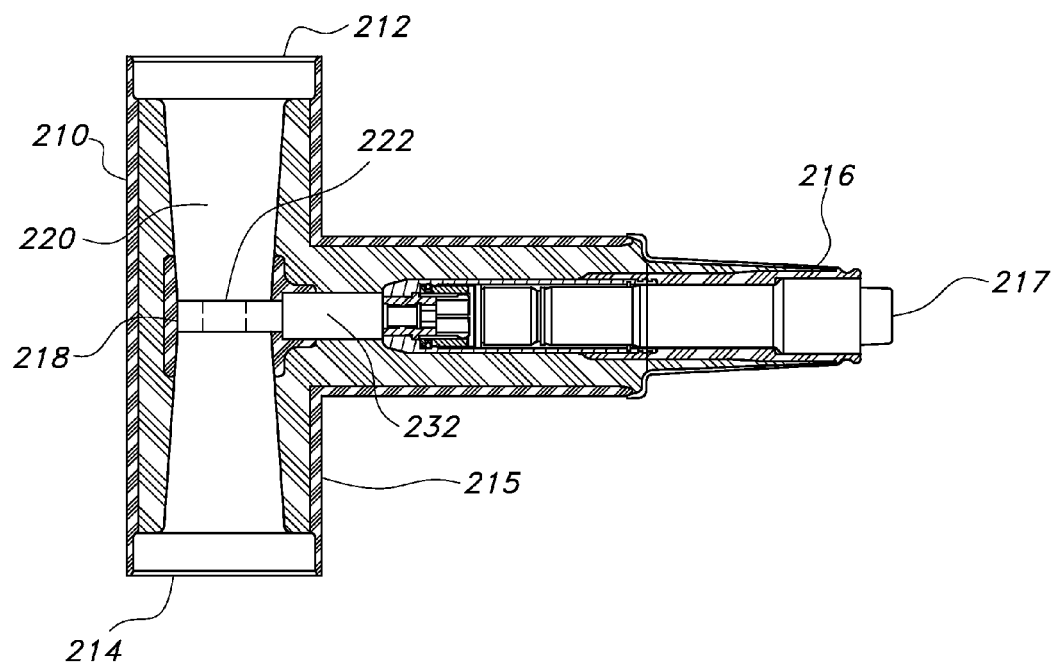
FIG. 3 is a sectional side view of a third embodiment of the electrical connector described herein with two female interfaces and a side interface for attaching 200 amp loadbreak elbow products.

FIG. 3 shows a third embodiment of the electrical connector 210 has a body 215 with two female interfaces 212, 214 on opposing ends of the passage 220 through the body and a side interface 216 for attaching 200 amp loadbreak elbow products. An electrical bus 232 extends from a female connector 218 with an aperture 222 located in the passage 220 to the distal end 217 of the side interface 216. The electrical connector 210 in FIG. 3 is the same as the electrical connector 10 in FIG. 1 except that the third interface 216 is a 200 amp loadbreak connector.

Figure 4:
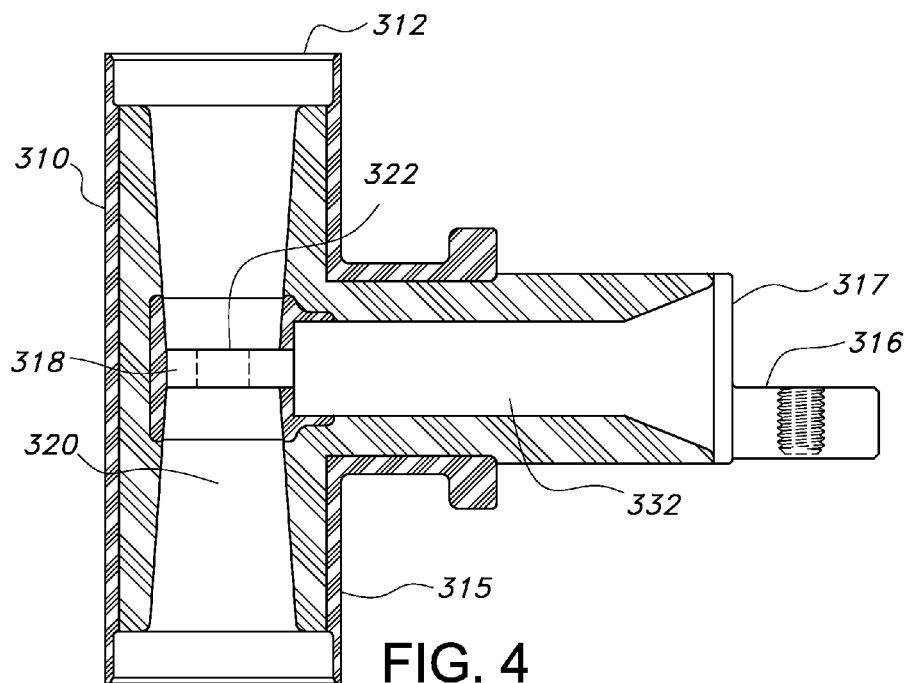
FIG. 4 is a sectional side view of a fourth embodiment of the electrical connector described herein with two female interfaces and a side interface for attaching a 600 amp deadbreak receptacle.

FIG. 4 shows a fourth embodiment of the electrical connector 310 has a body 315 with two female interfaces 312, 314 on opposing ends of the passage 320 through the body and a side interface 316 for attaching a 600 amp deadbreak receptacle. An electrical bus 332 extends from a female connector 318 with an aperture 322 located in the passage 320 to the distal end 317 of the side interface 316. The electrical connector 310 in FIG. 4 is the same as the electrical connector 10 in FIG. 1 except that the third interface 316 is a 600 amp deadbreak splice connector.

Figure 5:
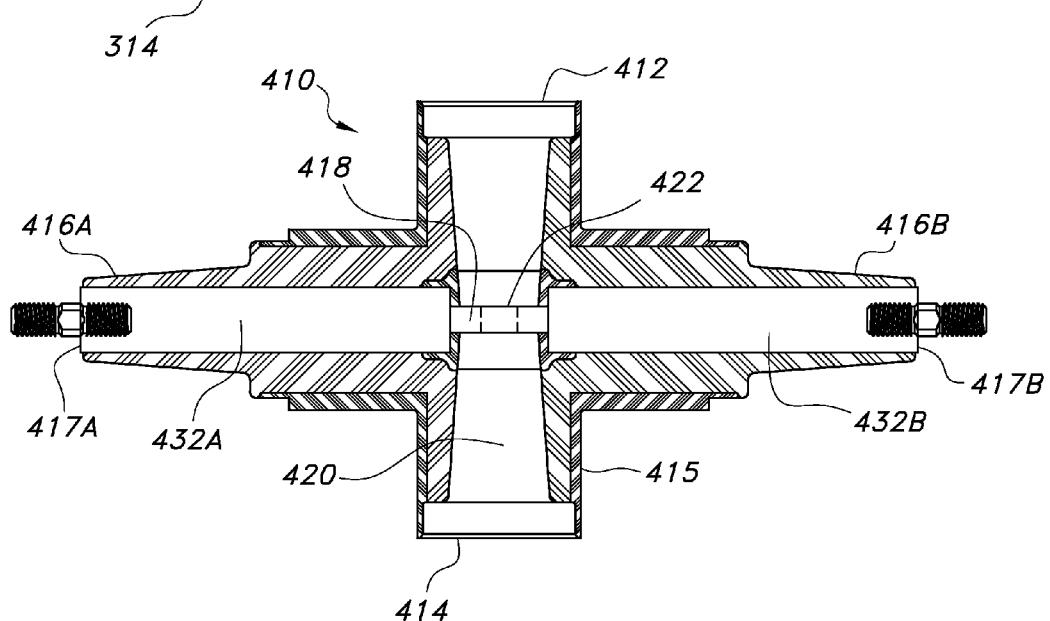
FIG. 5 is a sectional side view of a fifth embodiment of the electrical connector described herein with two female interfaces and two opposing 600 amp male side interfaces.

FIG. 5 shows a fifth embodiment of the electrical connector 410 has a body 415 with two female interfaces 412, 414 on opposing ends of the passage 420 through the body and two opposing 600 amp male interface side interfaces 416A, 416B. Two electrical buses 432A, 432B extend from a female connector 418 with an aperture 422 located in the passage 420 to the distal ends 417A, 417B of the side interfaces 416A, 416B. The electrical connector 410 in FIG. 5 is the same as the electrical connector 10 in FIG. 1 except that the third and fourth interfaces 416A, 416B are 600 amp male interfaces on opposite sides of the connector 410.

Figure 6:
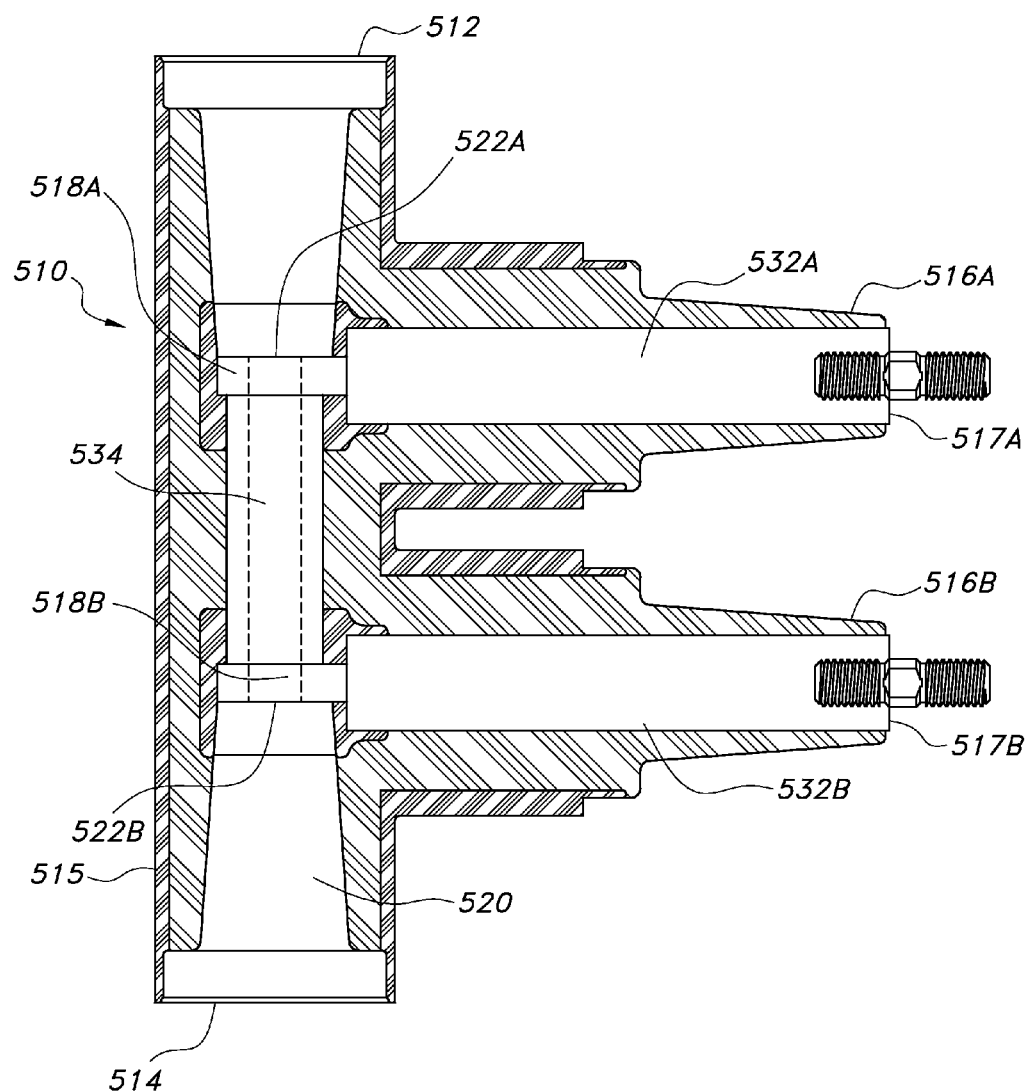
FIG. 6 is a sectional side view of a sixth embodiment of the electrical connector described herein with two female interfaces and two 600 amp male side interfaces on the same side.

FIG. 6 shows a sixth embodiment of the electrical connector 510 has a body 515 with two female interfaces 512, 514 on opposing ends of the passage 520 through the body and two 600 amp male interface side interfaces 516A, 516B on the same side. Two electrical buses 532A, 532B extend from two female connectors 518A, 518B with apertures 522A, 522B located in the passage 520 to the distal ends 517A, 517B of the side interfaces 516A, 516B. The female connectors 518A, 518B can be connected by a connecting pin (not shown) that passes through both female connectors 518A, 518B or by an electrically conductive element 534. When an electrically conductive element 534 is used, two connecting pins (not shown) are used to connect to the female connectors 518A, 518B. The electrical connector 510 in FIG. 6 is the same as the electrical connector 10 in FIG. 1 except that the third and fourth interfaces 516A, 516B are 600 amp male interfaces on the same side of the connector 510.

Figure 7:
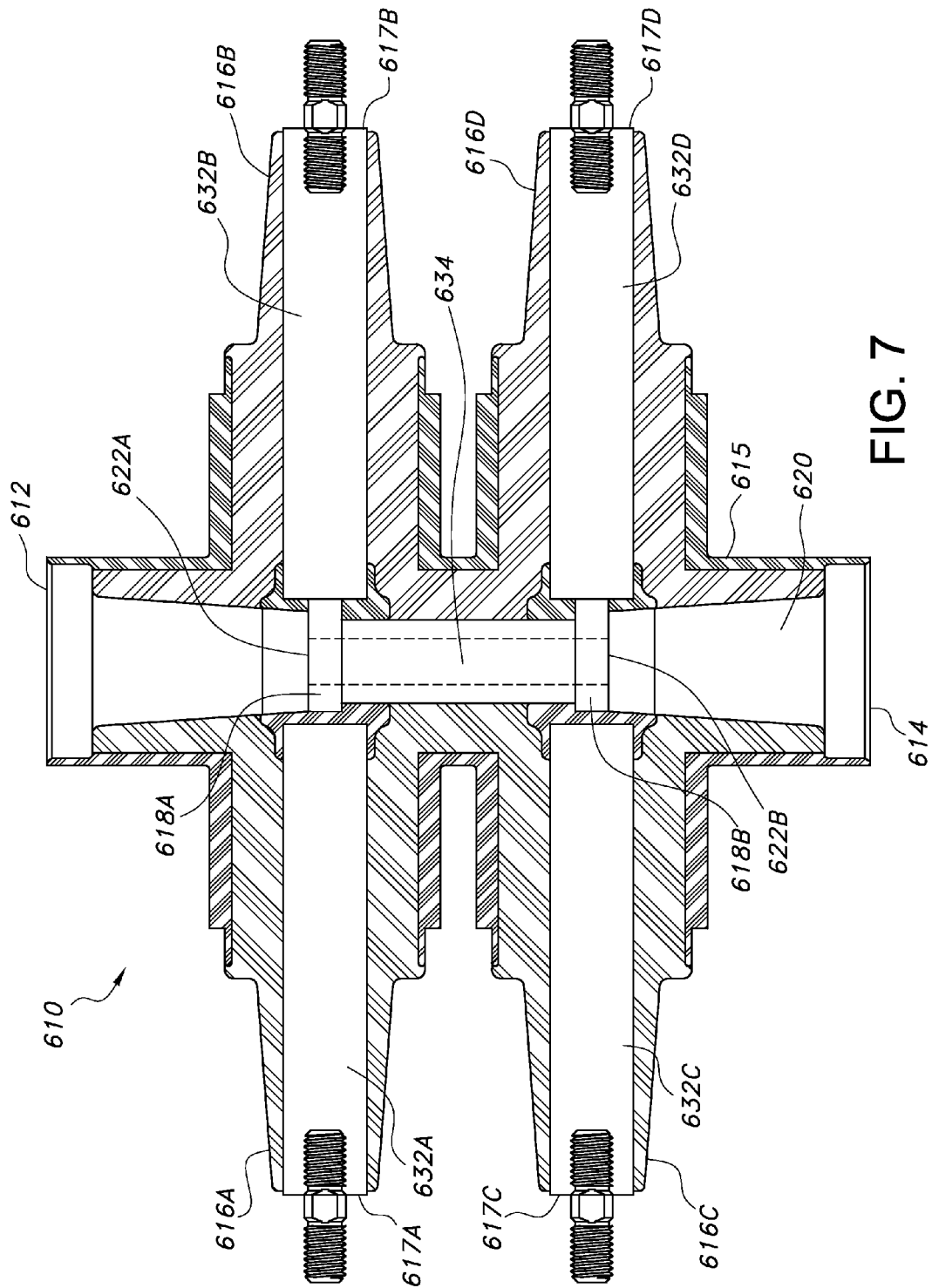
FIG. 7 is a sectional side view of a seventh embodiment of the electrical connector described herein with two female interfaces and two 600 amp male side interfaces on each side.

FIG. 7 shows a seventh embodiment of the electrical connector 610 has a body 615 with two female interfaces 612, 614 on opposing ends of the passage 620 through the body and two 600 amp male interface side interfaces 616A, 616B on one side and two 600 amp male interface side interfaces 616C, 616D on the opposite side of the connector 610. Four electrical buses 632A-D extend from two female connectors 618A, 618B with aperture 622A, 622B located in the passage 620 to the distal ends 617A-D of the side interfaces 616A-D. The female connectors 618A, 618B can be connected by a connecting pin (not shown) that passes through both female connectors 618A, 618B or by an electrically conductive element 634. When an electrically conductive element 634 is used, two connecting pins (not shown) are used to connect to the female connectors 618A, 618B. The electrical connector 610 in FIG. 7 is the same as the electrical connector 10 in FIG. 1 except that the third, fourth, fifth and sixth interfaces 616A-D are two pairs of 600 amp male interfaces on the opposite sides of the connector 610.

Figure 8:
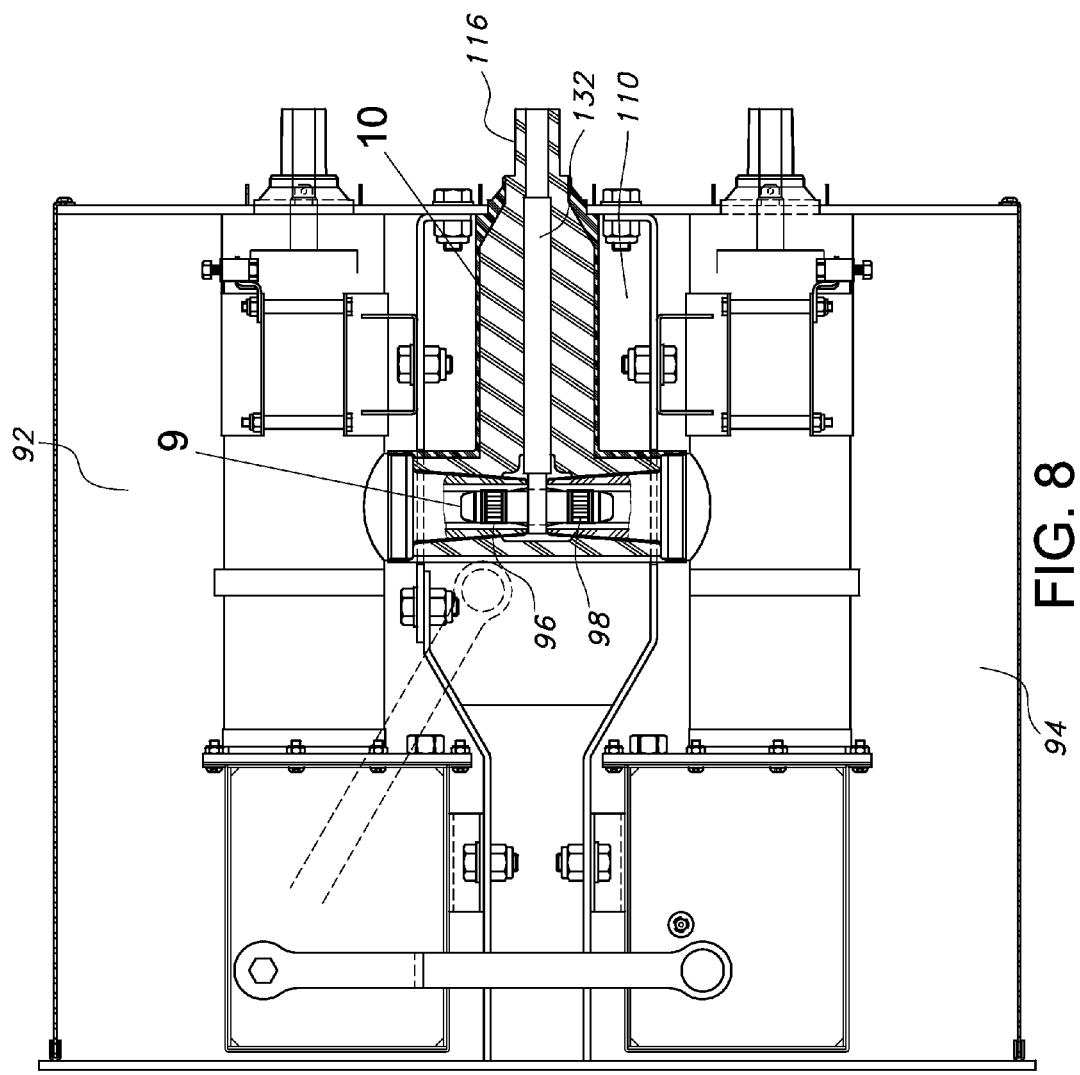
FIG. 8 is a plan view of the second embodiment of the electrical connector described herein connecting two switches.

FIG. 8 shows the second embodiment of the electrical connector 110 connecting two switches 92, 94. The electrical connector 110 with three interfaces is being used as a bus connector between two switches 92, 94 with the two female interfaces 112, 114 connected to the switches 92, 94. The third interface 116 can be a 200 or 600 or amp interface for the bus connection. The connection between the switches 92, 94 is made using a double ended connecting pin 124 pressed into the female connector 118 of the side interface bus 132 and the two louver-type contacts 96 in the switch bus 96, 98. Using an electrical connector 110 to connect each of the three interfaces of the switches 92, 94, allows a small configuration for a three way/two way switched unit, which can fit into confined spaces.

FIG. 9 shows the interface between the louver-type connector 96 on switch "A" 92 and the first end 126 (FIG. 11) of the connector pin 124. The louver-type connector 96 can be designed to interface with a 200 amp or a 600 amp connector pin 124.

FIG. 10 shows a sectional view of the electrical connector 110 with a connector pin 124 installed in the female connector 118 for the third interface bus 132. The connector pin 124 is used to connect male interfaces through the two female interfaces 112, 114 of the electrical connector 110.

FIG. 11 shows the connector pin 124. The first end of the pin 126 makes contact to switch "A" 92 through a first louver-type connector 96 and the second side of the pin 128 makes contact to switch "B" 94 through a second louver-type connector 98. The pin 124 has a knurl press fit center section 130 that is used to install the electrical connector 110 in the aperture 122 in the female connector 118 of the third interface bus 132. The connector pin 124 can be selected to connect to either a 200 amp or a 600 amp male interface with louver-type connectors 96, 98.

Figure 12:
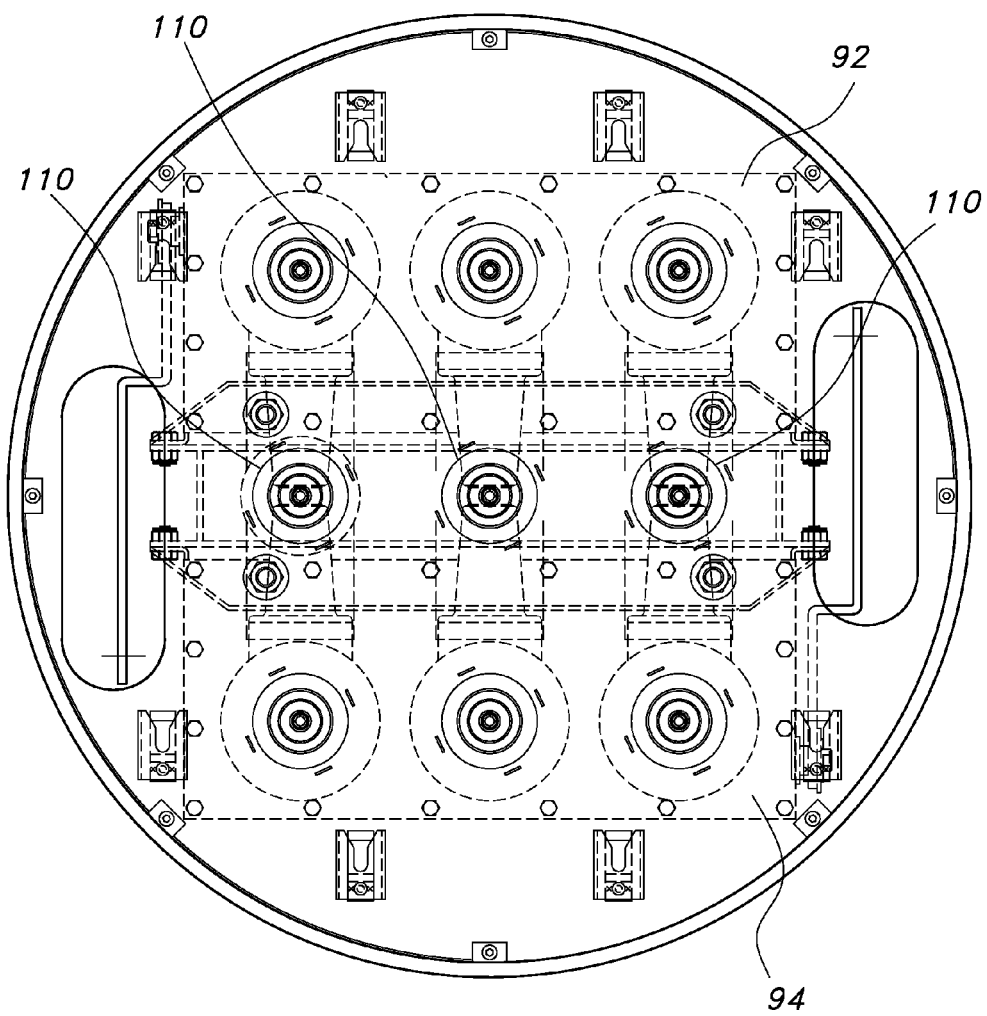
FIG. 12 is an end view of the two switches shown in FIG. 8 with three electrical connectors connecting the three legs of the switches.

FIG. 12 shows an end view of the two switches 92, 94 in FIG. 8 and three electrical connectors 110 connecting the three legs of the switches 92, 94. The compact design of the connectors 110 allow the two switches 92, 94 to be connected and installed in a minimum amount of space.

Thus, while there have been described the preferred embodiments of the electrical connector, those skilled in the art will realize that other embodiments can be made without departing from the spirit of the invention, and it is intended to include all such further modifications and changes as come within the true scope of the claims set forth herein.

I claim:

1. An electrical connector comprising:
a body having a longitudinal axis extending between a first end and a second end;
first and second female interfaces at the first and second ends with a passage extending therebetween;
a female connector located in the passage;
one or more side interfaces, wherein each side interface extends substantially perpendicular to the longitudinal axis from the body to a distal end and has a bus electrically connected to the female connector and extending to the distal end; and
a connecting pin installed in the female connector and having an intermediate portion with a knurled surface and first and second ends, wherein the first and second ends correspond with the first and second ends of the body and the intermediate portion of the connecting pin is frictionally secured in and electrically connects to the female connector and the bus(es) for the one or more interfaces;
wherein the first and second ends of the connecting pin are adapted to snugly engage louver-type connectors on male interfaces inserted into the first and second ends of the body.

2. The electrical connector according to claim 1, wherein the distance between the first and second ends of the body is less than 16 inches.

3. The electrical connector according to claim 1, wherein the distance between the first and second ends of the body is less than the distance from the longitudinal axis to the distal end of the one or more side interfaces.

4. The electrical connector according to claim 1, wherein the distance between the first and second ends of the connecting pin is between 4 and 16 inches.

5. The electrical connector according to claim 1, wherein the one or more side interfaces are rated at 200 amp or 600 amp and are a loadbreak connector, a deadbreak connector, a deadbreak splice connector, a male interface or a female interface.

6. The electrical connector according to claim 1, wherein the body of the electrical connector is constructed from a solid dielectric material.

7. The electrical connector according to claim 1, wherein the electrical connector has two side interfaces extending in opposing directions from the longitudinal axis.

8. The electrical connector according to claim 1, wherein the electrical connector has two side interfaces extending in the same direction from the longitudinal axis and two female connectors electrically connected by the connecting pin or by a bus.

9. The electrical connector according to claim 1, wherein the electrical connector has four side interfaces and two female connectors electrically connected by the connecting pin or by a bus, wherein two of the side interfaces extend in the same direction and two of the side interfaces extend in the opposite direction from the longitudinal axis.

10. The electrical connector according to claim 1, wherein the female connector is a snap-fit connector, a spade connector or a lug connector.

11. An electrical connector comprising:
a body having a longitudinal axis extending between a first end and a second end;
first and second female interfaces at the first and second ends with a passage extending therebetween;
a female connector located in the passage and having an aperture, wherein the aperture is coaxial with the passage;
a side interface extending substantially perpendicular to the longitudinal axis from the body to a distal end and having a bus electrically connected to the female connector and extending from the female connector to the distal end; and
a connecting pin installed in the female connector and having an intermediate portion with a knurled surface and first and second ends, wherein the first and second ends correspond with the first and second ends of the body, and wherein the intermediate portion of the connecting pin is frictionally secured in the female connector;
wherein the first and second ends of the connecting pin are adapted to snugly engage louver-type connectors on male interfaces that are inserted in the first and second ends of the body.

12. The electrical connector according to claim 11, wherein the connecting pin is electrically connected to the female connector and the bus.

13. The electrical connector according to claim 11, wherein the body of the electrical connector is constructed from a solid dielectric material.

14. The electrical connector according to claim 11, wherein the distance between the first and second ends of the body is less than the distance from the longitudinal axis to the distal end.

15. The electrical connector according to claim 11, wherein side interface is rated at 200 amp or 600 amp and is a loadbreak connector, a deadbreak connector, a deadbreak splice connector, a male interface or a female interface.

16. The electrical connector according to claim 11, wherein the distance between the first and second ends of the connecting pin is less than 6 inches.

17. The electrical connector according to claim 11, wherein the female connector is a snap-fit connector, a spade connector or a lug connector.

18. An electrical connector comprising:
- a body having a longitudinal axis extending between a first end and a second end;
- first and second female interfaces at the first and second ends with a passage extending therebetween;
- a female connector located in the passage and having an aperture, wherein the female connector is a snap-fit connector, a spade connector or a lug connector, and wherein the aperture is coaxial with the passage;
- a side interface extending substantially perpendicular to the longitudinal axis from the body to a distal end and having a bus electrically connected to the female connector and extending from the female connector to the distal end, and wherein the distance between the first and second ends of the body is less than the distance from the longitudinal axis to the distal end; and
- a connecting pin installed in the female connector and having an intermediate portion with a knurled surface and first and second ends, wherein the first and second ends correspond with the first and second ends of the body, and wherein the intermediate portion of the connecting pin is frictionally secured in and electrically connected to the female connector and the bus;
- wherein the first and second ends of the connecting pin are adapted to snugly engage louver-type connectors on male interfaces that are inserted in the first and second ends of the body.

19. The electrical connector according to claim 18, wherein the body of the electrical connector is constructed from a solid dielectric material.

20. The electrical connector according to claim 11, wherein side interface is rated at 200 amp or 600 amp and is a loadbreak connector, a deadbreak connector, a deadbreak splice connector, a male interface or a female interface.

* * * * *